Jan. 18, 1966     A. G. SCHNEIDER ET AL     3,229,874

VEHICLE BUMPER MOUNTED MOTORCYCLE SUPPORT MEANS

Filed June 23, 1964

Arthur G. Schneider
John A. Davis
INVENTORS

United States Patent Office 3,229,874
Patented Jan. 18, 1966

3,229,874
VEHICLE BUMPER MOUNTED MOTORCYCLE SUPPORT MEANS
Arthur G. Schneider, Richland, and John A. Davis, Prosser, Wash.; said Davis assignor to John Risk, Keith Moore, Hershil Rorie, and George Marvin
Filed June 23, 1964, Ser. No. 377,245
6 Claims. (Cl. 224—42.03)

This invention relates to new and useful improvements in carriers particularly although not necessarily for motorcycles, motor bikes, etc., and has for its primary object to provide, in a manner as hereinafter set forth, novel means whereby such vehicles may be conveniently and safely carried on the rear bumper of automobiles.

Another highly important object of the present invention is to provide an apparatus of the aforementioned character which may be expeditiously installed for use on an automobile bumper without the necessity of altering said bumper structurally.

Still another important object of the invention is to provide a cycle carrier of the character described which is readily adjustable to meet various conditions.

Still another important object of this invention is to provide a carrier of the character set forth which will permit the cycle to be mounted on the automobile bumper with a minimum of effort by a single person and without the use of tools.

Other objects are to provide a cycle carrier of the aforementioned character which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
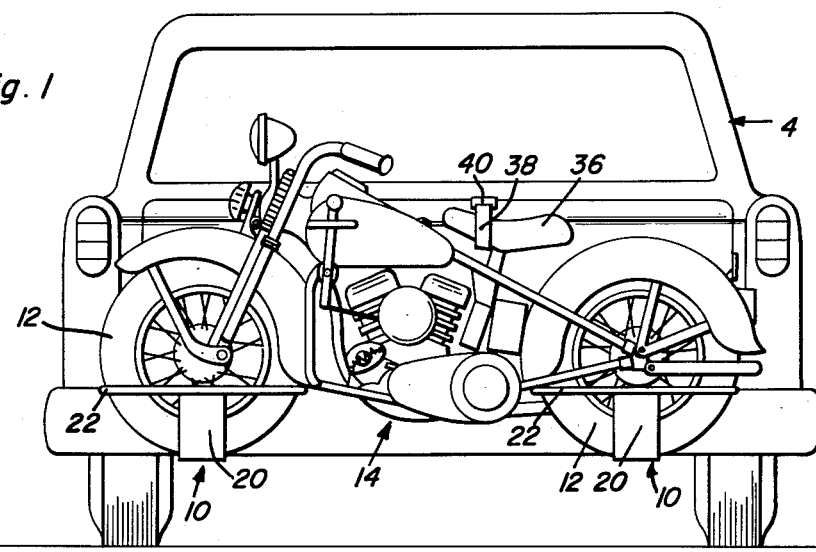
FIGURE 1 is a view in rear elevation, showing an apparatus embodying the present invention in use on the rear end of an automobile.

Referring now to the drawing in detail, it will be seen that the reference numeral 4 generally designates the rear portion of a conventional automobile. The automobile 4 includes the usual rear bumper 6, a trunk lid or cover 8, etc.

The embodiment of the present invention which has been illustrated comprises a pair of wheel wells or racks of suitable metal which are designated generally by reference numeral 10. The wells or racks 10 are for reception of the wheels 12 of a motorcycle or the like 14. Toward this end, the units 10 are secured at suitably spaced points on the rear bumper 6 of the vehicle 4.

Figure 2:
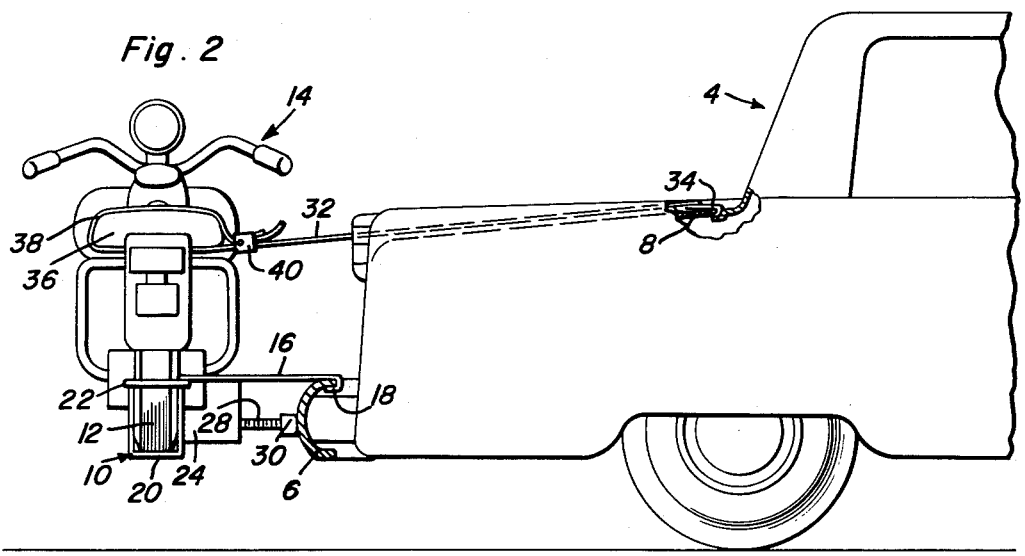
FIGURE 2 is a side elevational view of the vehicle with portions in section, showing the apparatus of the present invention in use.
Figure 3:
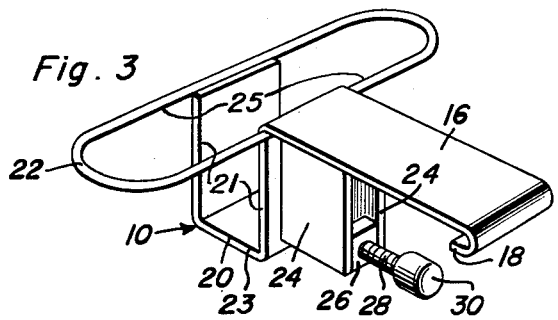
FIGURE 3 is a perspective view of one of the racks or wheel wells.

Each rack 10 includes a flat metallic arm 16 having one end portion reversely bent to provide a hook 18 which is engageable with the upper portion of the bumper 6 in the manner shown to advantage in FIGURE 2 of the drawing. The arm 16 further includes, on its outer or other end, a depending, generally U-shaped member 20 including a pair of upstanding leg portions 21 interconnected at their lower ends by means of a bight portion 23 extending therebetween. Mounted transversely on the end portions of the member 20 is an elongated, generally oval frame 22 including one pair of long opposite side portions 25 for the reception of a cycle wheel, one of the long leg portions 25 passing forwardly of the forwardmost leg 21 and beneath the base end of the arm 16.

A pair of metallic plates or gussets 24 are affixed to the underside of the arm 16 in a manner to depend therefrom and to the adjacent leg of the member 20. The gussets 24 are spaced from each other and fixed therebetween is a nut 26. The nut 26 threadedly receives an adjustable brace rod or prop 28 having on its free end a resilient pad 30 which is adapted to abut the rear bumper 6 in the manner shown.

To stabilize the motorcycle 14 when it is mounted on the rack 10, a strap 32 of suitable flexible material is provided. The stabilizing strap 32 includes on one end a hook 34 which is engaged with the front edge of the trunk lid 8 of the vehicle 4. The other end portion of the strap 32 is looped around the seat assembly 36 of the motorcycle 14 as indicated at 38 and adjustably secured by a suitable buckle or the like 40.

It is thought that the use of the invention will be readily apparent from a consideration of the foregoing. Briefly, the racks 10 may be expeditiously mounted on the vehicle bumper 6 simply by engaging the hooks 18 under the upper edge portion of said bumper and swinging the arms 16 downwardly for abutting the pads 30 of the props 28 with said bumper. In this manner the arms 16 are supported in a generally horizontal position, as will be apparent. It will be noted that the units 10 are adapted to be mounted at any suitable spaced points on the bumper to receive the wheels of the cycle to be transported. Vertical adjustment may be had by screwing the braces 28 into or out of the nuts 26. The hook 34 of the stabilizing strap 32 is then engaged with the leading edge of the vehicle trunk lid 8 (as shown) and the other end portion 38 of said strap is looped around the motorcycle seat assembly 36, drawn taut and tightened at 40. It will be noted that the construction and arrangement is such that with a minimum of effort the motorcycle may be mounted for transportation on the vehicle 4 by engaging the wheels of said motorcycle one at a time in the racks 10. The wheels 12 of the motorcycle 14 pass downwardly through the loops or frames 14 and rest in the members 20 of the racks. Thus, rolling or turning of the wheels is positively prevented. If desired, other stabilizing means for the mounted motorcycle may be provided. Of course, to remove the motorcycle and the apparatus of the present invention, the foregoing procedure is substantially reversed. Obviously, the carrier of the present invention may, if desired, be used for transporting bicycles as well as motorcycles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A carrier for transporting a two wheeled cycle on an automobile bumper and adapted to be utilized in pairs, each carrier comprising generally oblong and horizontally disposed frame means defining one pair of long opposite side portions interconnected at corresponding opposite end portions, a generally U-shaped member including a pair of upstanding leg portions interconnected at their lower ends by means of a bight portions extending therebetween, said U-shaped member being dependingly supported from said frame means with the upper ends of said leg portions secured to said long opposite side portions intermediate their opposite ends, said frame means and said U-shaped member being adapted to support a cycle wheel with diametrically opposite lower portions of said wheel embracingly received between said long opposite side portions and the lowest portion of said wheel resting upon said bight portion and received between the lower ends of said leg portions, elongated and generally horizontally disposed arm means anchored at one end portion to the upper end portion of one of said leg portions and projecting outwardly from the side of said one leg portion remote from the other leg portion, means carried by the free end portion of said arm means adapted to be removably anchored to the upper marginal portion of said bumper, said carrier further including abutment means disposed in a horizontal plane spaced vertically below said means carried by the free end portion of said arm means adapted to abuttingly engage a lower portion of said bumper.

2. The combination of claim 1 wherein the long side portion of said frame to which said one leg portion is secured extends across and is secured to the side of said one leg portion remote from the other leg portion.

3. The combination of claim 1 including gusset means extending between the side of said one leg portion remote from the other leg portion and the under portions of said arm means.

4. The combination of claim 3 wherein said abutment means is supported from said gusset means.

5. The combination of claim 4 wherein said abutment means is supported from said gusset means for adjustable positioning relative to the latter along a path generally paralleling said arm means.

6. The combination of claim 1 including elongated flexible tension member means adjustable in effective length and including opposite end portions adapted to be secured at one end to a cycle supported from said carrier and at the other end to a portion of the automobile from which said carrier is supported.

References Cited by the Examiner

UNITED STATES PATENTS

| 2,458,667 | 1/1949 | Williams | 280—502 |
| 2,552,977 | 5/1951 | Klotz. | |
| 2,576,222 | 11/1951 | Hill. | |
| 2,612,207 | 9/1952 | Branson | 224—42.03 |
| 2,663,474 | 12/1953 | Kelly | 224—42.03 |

FOREIGN PATENTS

| 63,784 | 7/1949 | Netherlands. |
| 200,882 | 1/1939 | Switzerland. |

GERALD M. FORLENZA, *Primary Examiner.*